(12) United States Patent
Hayakawa

(10) Patent No.: US 10,789,745 B2
(45) Date of Patent: Sep. 29, 2020

(54) INFORMATION PROCESSING APPARATUS AND INFORMATION PROCESSING METHOD

(71) Applicant: CANON KABUSHIKI KAISHA, Tokyo (JP)

(72) Inventor: Mizuki Hayakawa, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 100 days.

(21) Appl. No.: 15/869,218

(22) Filed: Jan. 12, 2018

(65) Prior Publication Data
US 2018/0218526 A1  Aug. 2, 2018

(30) Foreign Application Priority Data
Jan. 31, 2017  (JP) .................................. 2017-015519

(51) Int. Cl.
*G06T 11/60* (2006.01)
*H04N 1/00* (2006.01)

(52) U.S. Cl.
CPC ......... *G06T 11/60* (2013.01); *H04N 1/00145* (2013.01); *H04N 1/00161* (2013.01); *H04N 1/00167* (2013.01); *H04N 1/00196* (2013.01)

(58) Field of Classification Search
CPC .............. G06T 11/60; H04N 1/00145; H04N 1/00167; H04N 1/00161; H04N 1/00196
See application file for complete search history.

(56) References Cited

U.S. PATENT DOCUMENTS

| | | | | |
|---|---|---|---|---|
| 8,854,480 | B2* | 10/2014 | Yumiki | H04N 1/00442 348/207.2 |
| 2005/0219665 | A1* | 10/2005 | Mino | H04N 1/00167 358/537 |
| 2006/0050337 | A1* | 3/2006 | Hitaka | G06F 40/166 358/537 |
| 2006/0109516 | A1* | 5/2006 | Catalan | H04N 1/00132 358/302 |
| 2007/0088784 | A1* | 4/2007 | Chiba | G06F 40/166 709/206 |
| 2010/0313107 | A1* | 12/2010 | Hikida | G06F 40/106 715/202 |

(Continued)

FOREIGN PATENT DOCUMENTS

JP  2007-049518 A  2/2007
JP  2010-072934 A  4/2010

*Primary Examiner* — Ming Y Hon
(74) *Attorney, Agent, or Firm* — Venable LLP

(57) ABSTRACT

An information processing apparatus includes an analyzing unit to analyze information of a score and of a capture data and time for each of a plurality of image data, a laying-out unit to perform a laying-out processing in which image data is arranged in a template using the information of the score and the capture date and time, an image replacement unit to replace first image data arranged in a first slot of the template with second image data based on a user instruction, and a storage control unit to store information regarding the image replacement. When the first image data is rearranged in the first slot by performing the laying-out processing after the first image data is replaced with the second image data, the first image data is replaced with the second image data based on the stored image replacement information.

10 Claims, 25 Drawing Sheets

(56) References Cited

U.S. PATENT DOCUMENTS

| | | | |
|---|---|---|---|
| 2011/0026835 A1* | 2/2011 | Ptucha | G06F 16/583 |
| | | | 382/209 |
| 2011/0029860 A1* | 2/2011 | Ptucha | G06F 40/186 |
| | | | 715/246 |
| 2011/0197147 A1* | 8/2011 | Fai | G06F 3/017 |
| | | | 715/753 |
| 2012/0151332 A1* | 6/2012 | Kaneko | H04N 1/3875 |
| | | | 715/253 |
| 2013/0262261 A1* | 10/2013 | Rozek | G06Q 30/0621 |
| | | | 705/26.5 |
| 2014/0002354 A1* | 1/2014 | Nishigaki | H04N 21/42203 |
| | | | 345/156 |
| 2014/0010444 A1* | 1/2014 | Sasaki | G06K 9/00288 |
| | | | 382/165 |
| 2016/0260460 A1* | 9/2016 | Abe | H04N 1/3873 |
| 2016/0283483 A1* | 9/2016 | Jiang | G06F 16/248 |
| 2017/0039745 A1 | 2/2017 | Hayakawa | |
| 2017/0178058 A1* | 6/2017 | Bhat | G06T 7/20 |
| 2018/0164964 A1* | 6/2018 | Hori | G06T 11/60 |

\* cited by examiner

A-1

| SLOT ID | POSITION(x, y) | SIZE(w, h) | PRIORITY LEVEL |
|---|---|---|---|
| 4001 | 30, 30 | 320, 270 | 3 |
| 4002 | 450, 60 | 200, 160 | 1 |
| 4003 | 100, 320 | 200, 160 | 1 |
| 4004 | 450, 320 | 200, 160 | 1 |

B-1

| SLOT ID | POSITION(x, y) | SIZE(w, h) | PRIORITY LEVEL |
|---|---|---|---|
| 4011 | 100, 60 | 200, 160 | 1 |
| 4012 | 380, 30 | 320, 270 | 3 |
| 4013 | 100, 320 | 200, 160 | 1 |
| 4014 | 450, 320 | 200, 160 | 1 |

C-1

| SLOT ID | POSITION(x, y) | SIZE(w, h) | PRIORITY LEVEL |
|---|---|---|---|
| 4021 | 100, 60 | 200, 160 | 1 |
| 4022 | 450, 60 | 200, 160 | 1 |
| 4023 | 30, 250 | 320, 270 | 3 |
| 4024 | 450, 320 | 200, 160 | 1 |

D-1

| SLOT ID | POSITION(x, y) | SIZE(w, h) | PRIORITY LEVEL |
|---|---|---|---|
| 4031 | 100, 60 | 200, 160 | 1 |
| 4032 | 450, 60 | 200, 160 | 1 |
| 4033 | 100, 320 | 200, 160 | 1 |
| 4034 | 380, 250 | 320, 270 | 3 |

FIG.5

| IMAGE ID | CAPTURE DATE AND TIME | IMAGE DATA | SCORE |
| --- | --- | --- | --- |
| 001 | 2016/12/22 10:33:51 | BLOB data | 13 |
| 002 | 2016/12/22 14:22:15 | BLOB data | 81 |
| 003 | 2016/12/22 15:33:11 | BLOB data | 17 |
| 004 | 2016/12/23 10:16:51 | BLOB data | 85 |
| 005 | 2016/12/23 12:11:51 | BLOB data | 39 |
| 006 | 2016/12/24 08:15:10 | BLOB data | 36 |
| 007 | 2016/12/24 15:16:51 | BLOB data | 13 |

FIG.6

| IMAGE ID | SCORE | A-1 | | B-1 | | C-1 | | D-1 | |
|---|---|---|---|---|---|---|---|---|---|
| | | PRIORITY LEVEL | CALCULATED VALUE | PRIORITY LEVEL | CALCULATED VALUE | PRIORITY LEVEL | CALCULATED VALUE | PRIORITY LEVEL | CALCULATED VALUE |
| 002 | 81 | 3 | 243 | 1 | 81 | 1 | 81 | 1 | 81 |
| 004 | 85 | 1 | 85 | 3 | 255 | 1 | 85 | 1 | 85 |
| 005 | 39 | 1 | 39 | 1 | 39 | 3 | 117 | 1 | 39 |
| 006 | 36 | 1 | 36 | 1 | 36 | 1 | 36 | 3 | 108 |
| SUM | | | 403 | | 411 | | 319 | | 313 |

FIG.7

| SLOT ID | AUTOMATIC LAYOUT IMAGE ID | EDITED IMAGE ID |
|---|---|---|
| 4011 | 002 | |
| 4012 | 004 | |
| 4013 | 005 | |
| 4014 | 006 | |

FIG.8

| SLOT ID | AUTOMATIC LAYOUT IMAGE ID | EDITED IMAGE ID |
|---|---|---|
| 4011 | 002 | |
| 4012 | 004 | 001 |
| 4013 | 005 | 003 |
| 4014 | 006 | |

FIG.12

| AUTOMATIC LAYOUT IMAGE ID | EDITED IMAGE ID |
|---|---|
| 004 | 001 |
| 005 | 003 |

FIG.15

| SLOT ID | POSITION (x, y) | SIZE (w, h) | PRIORITY LEVEL |
|---|---|---|---|
| 4101 | 30, 30 | 320, 270 | 3 |
| 4102 | 450, 60 | 200, 160 | 1 |
| 4103 | 30, 320 | 200, 160 | 1 |
| 4104 | 260, 320 | 200, 160 | 1 |
| 4105 | 490, 320 | 200, 160 | 1 |

A-2

| SLOT ID | POSITION (x, y) | SIZE (w, h) | PRIORITY LEVEL |
|---|---|---|---|
| 4111 | 100, 60 | 200, 160 | 1 |
| 4112 | 380, 30 | 320, 270 | 3 |
| 4113 | 30, 320 | 200, 160 | 1 |
| 4114 | 260, 320 | 200, 160 | 1 |
| 4115 | 490, 320 | 200, 160 | 1 |

B-2

| SLOT ID | POSITION (x, y) | SIZE (w, h) | PRIORITY LEVEL |
|---|---|---|---|
| 4121 | 30, 60 | 200, 160 | 1 |
| 4122 | 260, 60 | 200, 160 | 1 |
| 4123 | 490, 60 | 200, 160 | 1 |
| 4124 | 30, 250 | 320, 270 | 3 |
| 4125 | 450, 320 | 200, 160 | 1 |

C-2

| SLOT ID | POSITION (x, y) | SIZE (w, h) | PRIORITY LEVEL |
|---|---|---|---|
| 4131 | 30, 60 | 200, 160 | 1 |
| 4132 | 260, 60 | 200, 160 | 1 |
| 4133 | 490, 60 | 200, 160 | 1 |
| 4134 | 100, 320 | 200, 160 | 1 |
| 4134 | 380, 250 | 320, 270 | 3 |

| IMAGE ID | SCORE | A-2 | | B-2 | | G-2 | | D-2 | |
|---|---|---|---|---|---|---|---|---|---|
| | | PRIORITY LEVEL | CALCULATED VALUE | PRIORITY LEVEL | CALCULATED VALUE | PRIORITY LEVEL | CALCULATED VALUE | PRIORITY LEVEL | CALCULATED VALUE |
| 002 | 81 | 3 | 243 | 1 | 81 | 1 | 81 | 1 | 81 |
| 004 | 85 | 1 | 85 | 3 | 255 | 1 | 85 | 1 | 85 |
| 005 | 39 | 1 | 39 | 1 | 39 | 1 | 39 | 1 | 39 |
| 006 | 36 | 1 | 36 | 1 | 36 | 3 | 108 | 1 | 37 |
| 003 | 17 | 1 | 17 | 1 | 17 | 1 | 17 | 3 | 51 |
| SUM | | | 420 | | 428 | | 330 | | 293 |

FIG.18

| SLOT ID | AUTOMATIC LAYOUT IMAGE ID | EDITED IMAGE ID |
|---|---|---|
| 4111 | 002 | |
| 4112 | 004 | |
| 4113 | 005 | |
| 4114 | 006 | |
| 4115 | 003 | |

FIG.20A

| SLOT ID | AUTOMATIC LAYOUT IMAGE ID | EDITED IMAGE ID |
|---|---|---|
| 4111 | 002 | |
| 4112 | 004 | 001 |
| 4113 | 005 | |
| 4114 | 006 | |
| 4115 | 003 | |

FIG.20B

| SLOT ID | AUTOMATIC LAYOUT IMAGE ID | EDITED IMAGE ID |
|---|---|---|
| 4111 | 002 | |
| 4112 | 004 | 001 |
| 4113 | 005 | 003 |
| 4114 | 006 | |
| 4115 | 003 | |

FIG.20C

| SLOT ID | AUTOMATIC LAYOUT IMAGE ID | EDITED IMAGE ID |
|---|---|---|
| 4111 | 002 | |
| 4112 | 004 | 001 |
| 4113 | 005 | 003 |
| 4114 | 006 | |
| 4115 | 003 | 005 |

| SLOT ID | POSITION(x, y) | SIZE(w, h) | PRIORITY LEVEL | CORRESPONDING ID |
|---------|----------------|------------|----------------|------------------|
| 4011 | 100, 60 | 200, 160 | 1 | 1 |
| 4012 | 380, 30 | 320, 270 | 3 | 2 |
| 4013 | 100, 320 | 200, 160 | 1 | 3 |
| 4014 | 450, 320 | 200, 160 | 1 | 4 |

B-2

| SLOT ID | POSITION(x, y) | SIZE(w, h) | PRIORITY LEVEL | CORRESPONDING ID |
|---------|----------------|------------|----------------|------------------|
| 4111 | 100, 60 | 200, 160 | 1 | 1 |
| 4112 | 380, 30 | 320, 270 | 3 | 2 |
| 4113 | 30, 320 | 200, 160 | 1 | 3 |
| 4114 | 260, 320 | 200, 160 | 1 | 4 |
| 4115 | 490, 320 | 200, 160 | 1 | 5 |

FIG.23

| SLOT ID BEFORE CHANGE | SLOT ID AFTER CHANGE | IMAGE ID |
|---|---|---|
| 4011 | | 002 |
| 4012 | | 001 |
| 4013 | | 003 |
| 4014 | | 006 |
| | | |

FIG.24A

| SLOT ID BEFORE CHANGE | SLOT ID AFTER CHANGE | IMAGE ID |
|---|---|---|
| 4011 | 4111 | 002 |
| 4012 | 4112 | 001 |
| 4013 | 4113 | 003 |
| 4014 | 4114 | 006 |
| | 4115 | |

FIG.24B

| SLOT ID BEFORE CHANGE | SLOT ID AFTER CHANGE | IMAGE ID |
|---|---|---|
| 4011 | 4111 | 002 |
| 4012 | 4112 | 001 |
| 4013 | 4113 | 003 |
| 4014 | 4114 | 006 |
| | 4115 | 004 |

FIG.24C

INFORMATION PROCESSING APPARATUS AND INFORMATION PROCESSING METHOD

BACKGROUND OF THE INVENTION

This application claims the benefit of Japanese Patent Application No. 2017-015519 filed Jan. 31, 2017, which is hereby incorporated by reference herein in its entirety.

FIELD OF THE INVENTION

The present invention relates to a technology of automatically laying out image data in a template of a photo album.

DESCRIPTION OF THE RELATED ART

Conventionally, a technology for laying out image data in a template on the basis of characteristics of the image data for automatically generating a photo album has been known (see Japanese Patent Laid-Open No. 2010-72934).

In addition, a technology for maintaining the characteristics of a template without changing the position and the size of a main image in a case when the template in which images are laid out is changed has been known (see Japanese Patent Laid-Open No. 2007-49518).

However, in a case when a user performs a laying-out process again after editing such as replacement of an image laid out in a template, there is a problem in that a result of the user's editing (in other words, a content edited by the user) is discarded.

SUMMARY OF THE INVENTION

An information processing apparatus according to one embodiment of the present invention includes a laying-out unit configured to lay out image data in a template, a storage unit configured to store a content edited by a user for a layout result acquired using the laying-out unit, and a reflection unit configured to reflect the edited content on a re-layout result in a case when the image data is re-laid out by the laying-out unit.

Further features of the present invention will become apparent from the following description of exemplary embodiments with reference to the attached drawings.

BRIEF DESCRIPTION OF THE DRAWINGS

FIG. 5 is a diagram illustrating a template data table according to Embodiment 1;
FIG. 6 is a diagram illustrating an image data table according to Embodiment 1;
FIG. 7 is a diagram illustrating an automatic layout calculation table according to Embodiment 1;
FIG. 8 is a diagram illustrating an automatic layout result table according to Embodiment 1;
FIG. 12 is a diagram illustrating an automatic layout result table after editing according to Embodiment 1;
FIG. 15 is a diagram illustrating a re-layout saving table according to Embodiment 1;
FIG. 17 is a diagram illustrating a template data table of a re-laying out process according to Embodiment 1;
FIG. 18 is a diagram illustrating a re-layout calculation table according to Embodiment 1;
FIGS. 20A to 20D are diagrams illustrating the procedure of a re-laying out process and a re-layout result table according to Embodiment 1;
FIG. 23 is a diagram illustrating a template data table according to Embodiment 2;
FIGS. 24A to 24C are diagrams illustrating the procedure and a conversion table in the re-laying out process according to Embodiment 2.

DESCRIPTION OF THE EMBODIMENTS

Hereafter, preferred embodiments of the present invention will be described in detail with reference to the attached drawings. However, the embodiments described below are not for the purpose of limiting the present invention relating to the claims. In addition, not all of the combinations of features described in the embodiments are essential to the present invention.

Embodiment 1

Figure 1:
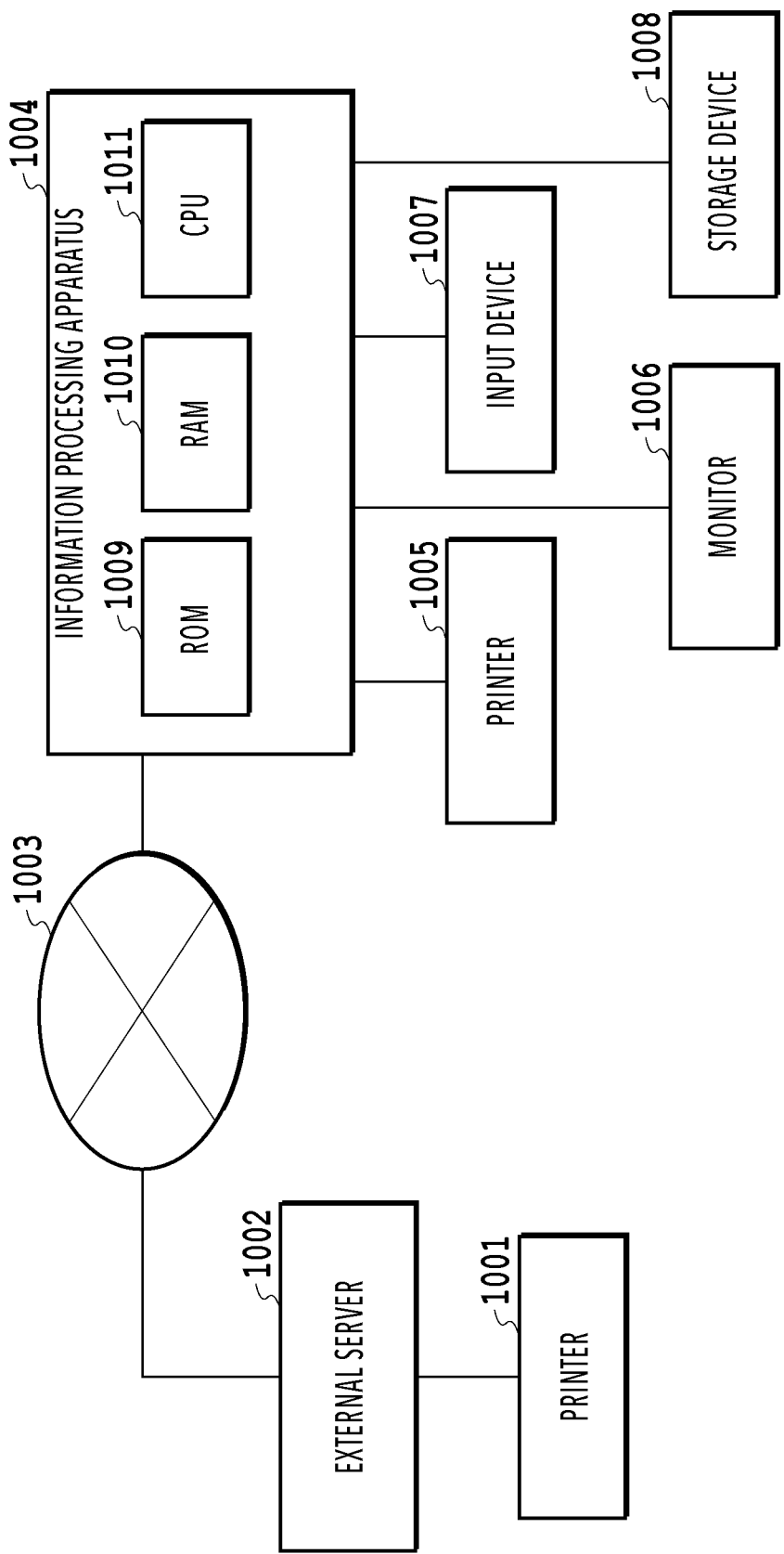
FIG. 1 is a configuration diagram of a photo album generating system according to Embodiment 1.

FIG. 1 illustrates the configuration of a photo album generating system according to the present embodiment. An information processing apparatus 1004 can generate photo album data including input image data. In addition, the information processing apparatus 1004 can output the generated album data to a printer 1005 as print data or upload the generated album data to an external server 1002 through a network 1003.

The information processing apparatus 1004 includes a read only memory (ROM) 1009, a random access memory (RAM) 1010, and a central processing unit (CPU) 1011. In addition, the information processing apparatus 1004 includes a printer 1005, a monitor 1006, an input device 1007, a storage device 1008, and an input/output interface (not illustrated in the drawing) used for a connection with the network 1003.

The CPU 1011 executes an operating system program (hereafter, abbreviated as an OS) stored in the storage device 1008, the ROM 1009, or the RAM 1010, thereby controlling the overall operation of the information processing apparatus 1004. In addition, the CPU 1011 executes various programs stored in the ROM 1009 or the RAM 1010, thereby realizing each functional configuration of the information processing apparatus 1004, performing an arithmetic operation and processing of information, and controlling each hardware element.

The ROM 1009 is a memory that is dedicatedly used for reading and stores various programs. The RAM 1010 is a work memory of the CPU 1011. The RAM having non-volatility stores various programs.

The network 1003 connects the information processing apparatus 1004 and the external server 1002, and delivers the information thereof. The external server 1002 includes an input/output interface (not illustrated in the drawing) used for a connection with a printer 1001 and has the printer 1001 connected thereto.

The album data generated by the information processing apparatus 1004 is uploaded to the external server 1002 through the network 1003. In a case when uploaded album data is printable, the external server 1002 outputs the uploaded album data to the printer 1001. The external server 1002, for example, is an order-receiving/managing server for an album. In other words, in a case when a user uploads album data generated by his own information processing apparatus 1004 and performs a necessary album purchase procedure through a web browser (not illustrated in the drawing), or the like, the album data is printed by the printer 1001. Thereafter, a print material printed by the printer 1001 is bound as a book and reaches the user.

The printer 1005 connected to the information processing apparatus 1004 is a printer used for printing album data generated by the information processing apparatus 1004. In one embodiment, album data generated by a user may be printed by the printer 1005 owned by the user, and the user may perform bookbinding thereof to be completed as an album. A monitor 1006 is a display device that displays image information output by the information processing apparatus 1004. The input device 1007 is an input device such as a keyboard or a pointing device used for performing input for the information processing apparatus 1004. In one embodiment, the input device 1007 may be a device that is integrated with the monitor 1006 and has a configuration in which input is performed by a user directly being in contact with the monitor 1006. The storage device 1008 is a storage device, such as a hard disk drive (HDD) or a solid data drive (SDD) storing image data, a template of an album, and the like.

In FIG. 1, although the information processing apparatus 1004 and the monitor 1006, the input device 1007, and the storage device 1008 are described as separate devices, in one embodiment, the information processing apparatus 1004 and the devices described above are integrated together. In other words, the monitor, the input device, and the storage device (may be shared by the RAM of the information processing apparatus) may be included as components of the information processing apparatus 1004.

Figure 2A:
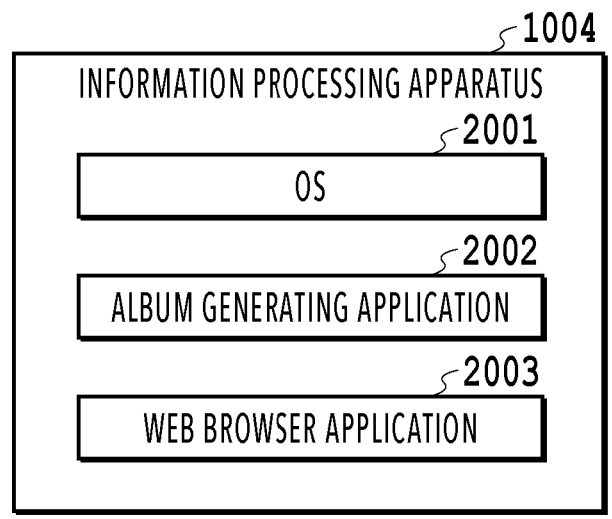
FIG. 2A is a software configuration diagram of an information processing apparatus according to Embodiment 1.

FIG. 2A illustrates a software configuration diagram of the information processing apparatus 1004 according to the present embodiment. As illustrated in FIG. 2A, the information processing apparatus 1004 is configured to include an OS 2001, an album generating application 2002, a web browser application 2003, and the like. The functions of such software are realized by the CPU 1011 of the information processing apparatus 1004 reading and executing various programs stored in the ROM 1009, the RAM 1010, or the storage device 1008.

When executed by the CPU 1011 as described above, the OS 2001 controls the overall operation of the information processing apparatus 1004.

When executed by the CPU 1011, the album generating application 2002 reads image data or a template of an album stored in the RAM 1010 or the storage device 1008 and generates album data in accordance with a user operation. In other words, when executed by the CPU 1011, the album generating application 2002 functions as units for realizing each function of the information processing apparatus 1004. In addition, the album generating application 2002 provides various user interfaces (hereafter, also referred to as UIs) used for generating album data. A user can perform an operation for generating an album in accordance with a user interface provided by the album generating application 2002.

When executed by the CPU 1011, the web browser application 2003 enables a user to access the external server 1002 through the network 1003. For example, as described above, a user can perform an album purchase procedure, and the like, by accessing the external server 1002 by using the web browser application 2003.

Figure 2B:
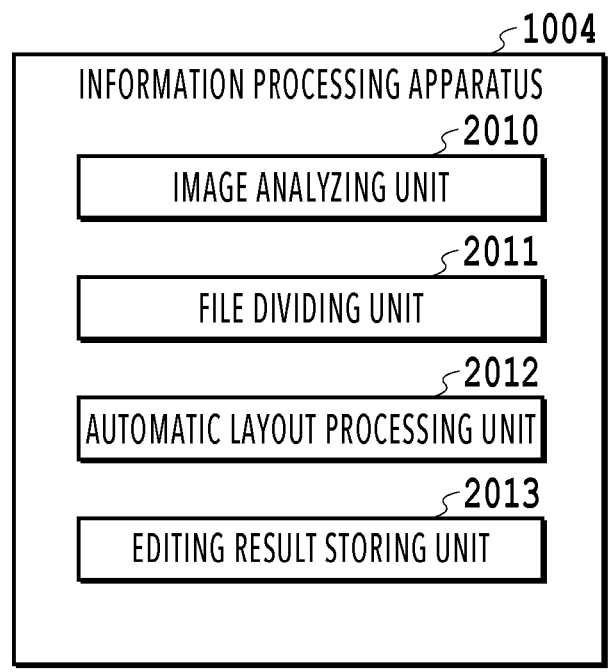
FIG. 2B is a functional block diagram of an information processing apparatus according to Embodiment 1.

FIG. 2B illustrates a functional block diagram of the information processing apparatus 1004 according to the present embodiment. As illustrated in FIG. 2B, the information processing apparatus 1004 according to the present embodiment mounts the following processing units by executing the album generating application 2002 by using the CPU 1011.

The image analyzing unit 2010 performs analyses and scoring of a plurality of image files (a plurality of pieces of image data) to be laid out in an album and stores a result (analysis scores) in the RAM 1010 or the storage device 1008. For example, there are a method using rating information stored in image meta information and a method using an independent criterion using a face detection result, a histogram of an image, and a frequency analysis.

A file dividing unit 2011 divides a plurality of image files for each page of an album. For example, there are a method of uniformly allocating images to each page, a method of performing clustering using a capture date and time of each image and allocating each cluster to each page.

An automatic layout processing unit 2012 lays out a plurality of divided image files into a template. In other words, the automatic layout processing unit 2012 functions as a laying-out unit. More specifically, the automatic layout processing unit 2012 selects a template appropriate for the divided image files from among a plurality of templates and allocates each image file to each slot of the selected template.

An editing result storing unit 2013 functions to store a user's editing result (in other words, a content edited by a user) for a layout result. More specifically, the editing result storing unit 2013 stores a user's edited content in a storage unit such as the storage device 1008 to be saved. In addition, the editing result storing unit 2013 reflects a user's edited content stored in a storage unit, such as the storage device 1008, on a re-layout result. In other words, the editing result storing unit 2013 functions also as a reflection unit of a user's edited content.

In addition, the functions of the information processing apparatus 1004 are not limited to the functions described above and may have other functions.

Figure 3:
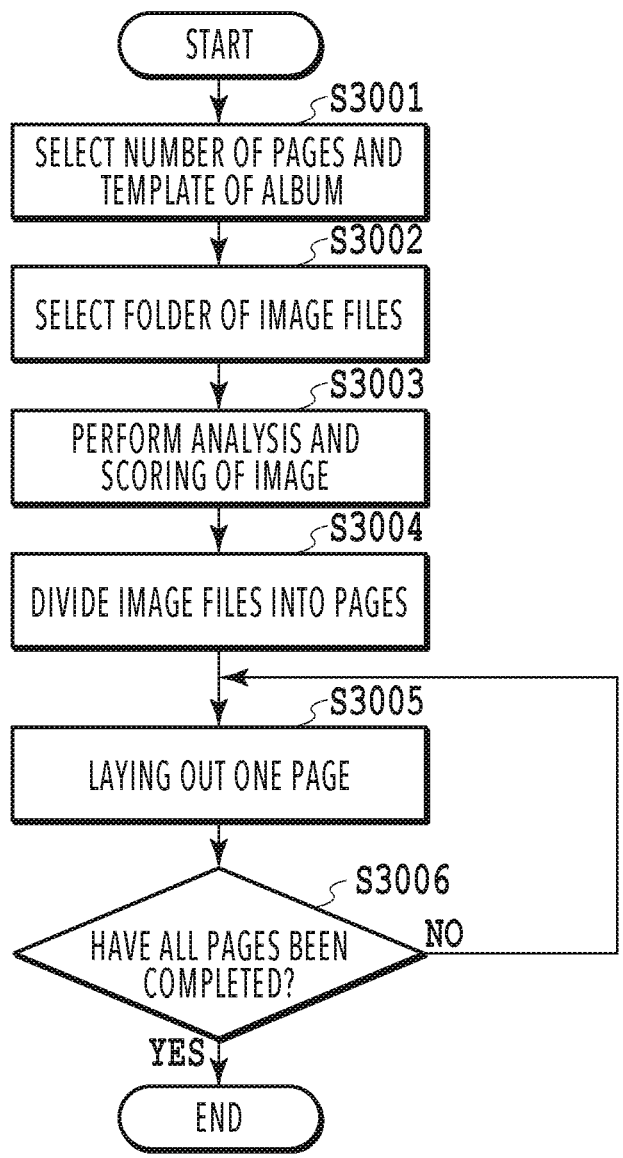
FIG. 3 is a flowchart of an automatic laying-out process according to Embodiment 1.

FIG. 3 illustrates a flowchart of an automatic laying-out process of image data in the information processing apparatus 1004. The following process is performed by the information processing apparatus 1004 executing the album generating application 2002.

In Step S3001, a user selects the number of pages of an album and a template in accordance with a UI provided by the album generating application 2002. The template is generated by a designer, or the like, in advance and is stored in the storage device 1008 as template data. In the description presented below, one template corresponds to one page of both left and right faces of an album and includes layout information of images inside the page, in other words, slot information used for laying out image data.

Figure 4:
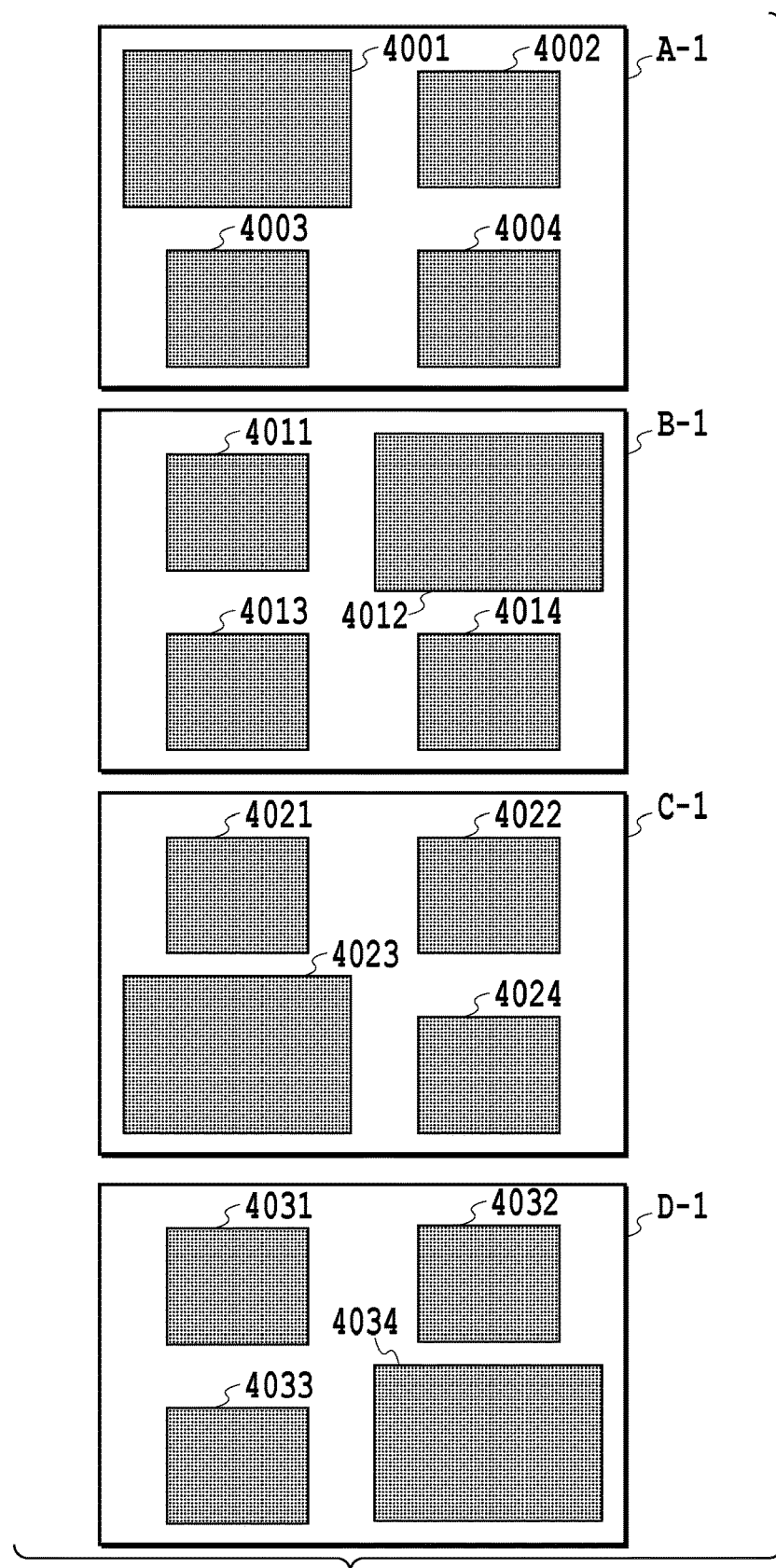
FIG. 4 is a diagram of drawings of template data according to Embodiment 1.

FIG. 4 is a diagram of drawings A-1, B-1, C-1, and D-1 of four templates drawn according to each template data. Each template data includes slots to which image data is allocated. For example, four slots 4001, 4002, 4003, and 4004 are included in the template A-1. In the description presented below, such four templates are assumed to be selected by a user.

A template data table illustrated in FIG. 5 stores the coordinate values (a position and a size), a priority level, and the like, of each slot included in each of the four templates A-1, B-1, C-1, and D-1 described above.

In addition, although each template described above includes four slots, the number of slots is not limited thereto. In addition, the number of slots of each template may be other than four.

In Step S3002, the user selects a folder in which image files are stored in accordance with a UI provided by the album generating application 2002. The folder to be selected may be present in the storage device 1008 or an external memory connected to the information processing apparatus 1004.

In Step S3003, the information processing apparatus 1004 acquires image files from the folder selected by the user, performs an analysis and scoring of an image by using the image analyzing unit 2010, and stores a result (analysis score) thereof. FIG. 6 illustrates an image data table storing a scoring result, and the like. In the image data table, an image identifier (image ID), a capture date and time, image data, an analysis score (scoring result), and the like, of an image file are included. The scoring is performed using rating information stored in the image meta information or is performed using an independent criterion by using a face detection result, a histogram of an image, or a frequency analysis. In addition, the image data is converted into a form that can be stored in a database such as a binary large object (hereafter, referred to as a BLOB) format, or the like, and is stored in an image data table. FIG. 6 illustrates a result of scoring seven image files as an example.

In Step S3004, the information processing apparatus 1004 divides a plurality of image files for each page by using the file dividing unit 2011. For example, there are a method of uniformly allocating images for each page, a method of performing clustering by using a capture date and time of an image and allocating each cluster to each page, and the like. Hereafter, for the simplification of description, image files included in the image data table illustrated in FIG. 6 are assumed to be image files divided for being arranged in an arbitrary one page.

In a case when an album is generated using image files having low resolution, the quality of printing is degraded, and, accordingly, each image file having a predetermined resolution or less is excluded from division. In addition, the exclusion of image files may be performed in the image analyzing and scoring process of Step S3003. In such a case, image files having a predetermined resolution or less are not registered in the image data table, and the process of dividing image files is performed on the basis of an image data table from which the files having the predetermined resolution or less are excluded.

In Step S3005, the information processing apparatus 1004 lays out the divided image files into a template for an arbitrary one page (normally, the first one page). In other words, the automatic layout processing unit 2012 functions as a laying-out unit. Here, a template that is appropriate for the divided image files is selected, and the image files are allocated to slots of the selected template.

FIG. 7 is an automatic layout calculation table used for automatically laying out image files. Hereafter, the process of Step S3005 will be described in detail with reference to the automatic layout calculation table illustrated in FIG. 7.

First, since each template selected in Step S3001 includes four slots, the information processing apparatus 1004 acquires four pieces of image data in order of highest to lowest analysis score from the image data table illustrated in FIG. 6 and rearranges the acquired image data in order of a capture date and time. More specifically, four image files respectively having an image ID 004 (score 85), an image ID 002 (score 81), an image ID 005 (score 39), an image ID 006 (score 36) are acquired from the image data table illustrated in FIG. 6 in order of highest to lowest score. When such image data is rearranged in order of capture date and time, the order of the image ID 002 (score 81), the image ID 004 (score 85), the image ID 005 (score 39), the image ID 006 (score 36) is formed. According to the process up to here, the information processing apparatus 1004 stores values in a first "image ID" and a second "score" in the automatic layout calculation table illustrated in FIG. 7.

Next, the information processing apparatus 1004 acquires a "priority level" of each slot included in each template from the template data table illustrated in FIG. 5 and sets the acquired priority levels in the automatic layout calculation table illustrated in FIG. 7 according to the order of "slot ID (slot identifier)". More specifically, values are stored in the "priority levels" of the third, fifth, seventh, and ninth templates of the automatic layout calculation table illustrated in FIG. 7.

Next, the information processing apparatus 1004 multiplies the "score" of the second image data of the automatic layout calculation table illustrated in FIG. 7 by the "priority level" of each of the third, fifth, seventh, and ninth templates. The information processing apparatus 1004 stores a value acquired by multiplying the "score" by the "priority level" in a "calculated value" of each of the fourth, sixth, eighths, and tenth templates of the automatic layout calculation table illustrated in FIG. 7.

Next, the information processing apparatus 1004 calculates a sum value of the "calculated values" for each template and stores the sum value in a row of "sum". In this way, a sum value of values acquired by multiplying analysis scores of image data by priority levels set for the slots of each template is acquired.

Next, the information processing apparatus 1004 selects a template having a largest sum value. In the present embodiment, since the sum value (411) of a template B-1 is largest, the template B-1 is selected.

Figure 9:
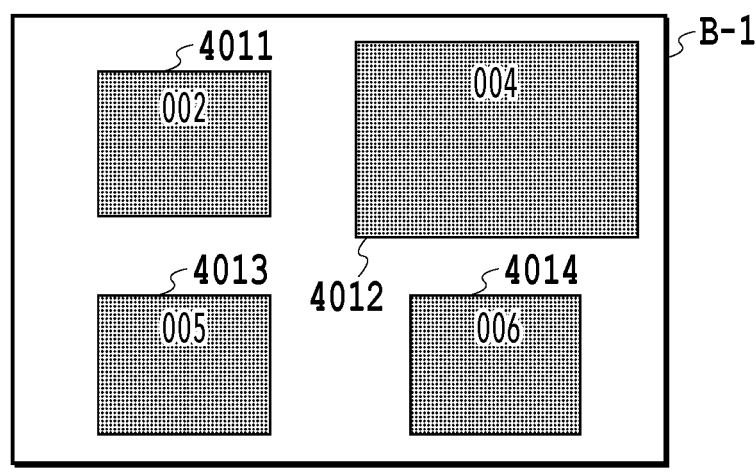
FIG. 9 is a diagram illustrating an automatic layout result according to Embodiment 1.

Finally, the information processing apparatus 1004 stores an "image ID" of the automatic layout calculation table illustrated in FIG. 7 and each "slot ID" of the selected template B-1 in association with each other. FIG. 8 is a diagram illustrating an automatic layout result table in which an "automatic layout image ID" that is automatically laid out and a "slot ID" are associated with each other. In the automatic layout result table illustrated in FIG. 8, a slot ID included in the template B-1 of the template data table illustrated in FIG. 5 is acquired simply in order from the upper side, an image ID included in the automatic layout calculation table illustrated in FIG. 7 is acquired in order from the upper side, and the acquired slot ID and the acquired image ID are stored in association with each other. FIG. 9 is a diagram of a drawing of the template B-1 based on the automatic layout result table illustrated in FIG. 8. As illustrated in the drawing, image data of each of image IDs (image identifiers) 002, 004, 005, and 006 of the slots 4011, 4012, 4013, and 4014 is drawn based on template data. An "edited image ID" included in the automatic layout result table illustrated in FIG. 8 is used when an editing operation of a photo album to be described later is performed.

In this way, in Step S3005, a template that is appropriate for divided image files is automatically selected from among the templates selected by the user, and the image files are automatically laid out.

In Step S3006, the information processing apparatus 1004 determines whether or not the laying-out of all the pages of the album has been completed. In a case when the laying-out of all the pages has not been completed, the process is returned to Step S3005, and the process is repeated for the next page. On the other hand, in a case when the laying-out of all the pages has been completed, the process ends.

According to the process of the flow described above, image files can be laid out by automatically allocating image files for the template.

Figure 10:
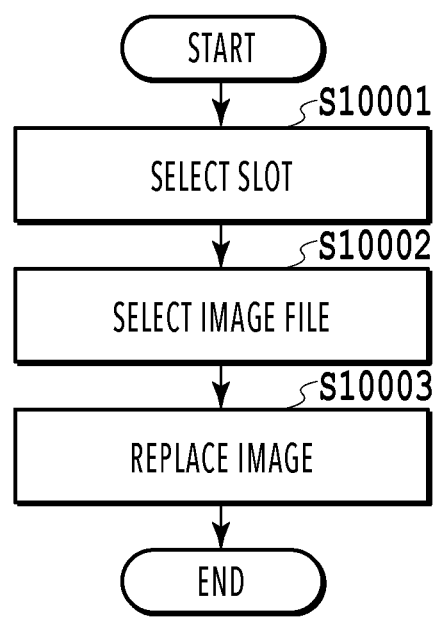
FIG. 10 is a flowchart of an editing operation according to Embodiment 1.

FIG. 10 illustrates a flowchart of a user's editing operation. Hereafter, a user's editing operation of a photo album will be described in detail with reference to FIG. 10. The user's editing operation is performed on a UI provided by the album generating application 2002. As the user's editing operation, here, an editing operation of replacing an automatically laid-out image file with another image file will be described.

In Step S10001, a user selects a slot of an image file to be replaced on a selected page.

Figure 11:
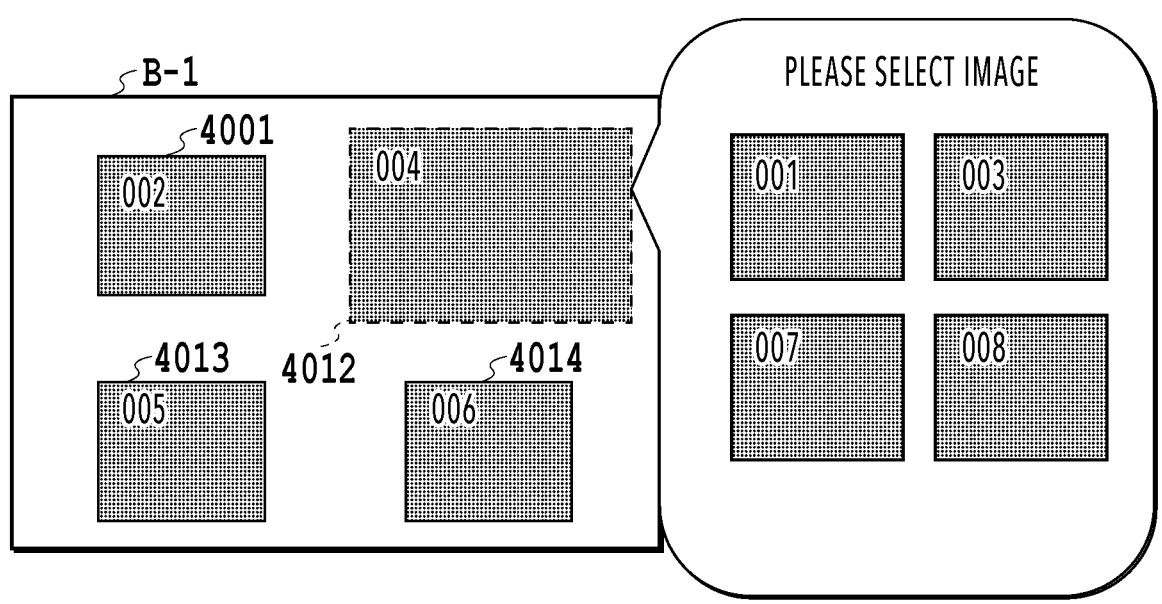
FIG. 11 is a diagram illustrating a user interface for an editing operation according to Embodiment 1.

In Step S10002, the user selects another image file to be replaced into the slot selected in Step S10001. For example, the information processing apparatus 1004, as illustrated in a user interface in FIG. 11, image files stored in the storage device 1008 are displayed as thumbnails for enabling a user's selection. In FIG. 11, a slot 4012 of the template B-1 is selected, and an image having an image ID of "004" is replaced. Other than that, in the case of interchange of images between slots, the user can also select another slot to select an image file designated in the slot.

In Step S10003, the information processing apparatus 1004 performs an image file replacing process and, as illustrated in FIG. 12, stores an image identifier (image ID) of an image file replaced into the automatic layout result table. On the user interface, a state is formed in which another image file selected by the user is displayed in the slot selected by the user.

FIG. 12 illustrates an automatic layout result table after editing. Here, it is illustrated that image files (image IDs 004 and 005) of slots 4012 and 4013 of the template B-1 are respectively replaced with image files of image IDs 001 and 003. In other words, in the "edited image ID" of the automatic layout result table illustrated in FIG. 8, the image IDs (image identifiers) of other replacing image files are stored. In this way, the photo album editing process is completed.

Figure 13:
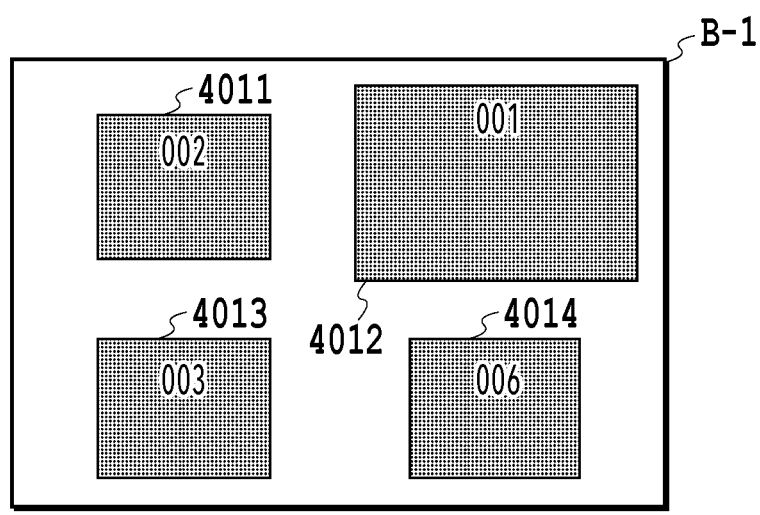
FIG. 13 is a diagram of drawing of an editing result according to Embodiment 1.

FIG. 13 illustrates a diagram of drawing of a template B-1 based on an automatic layout result table after the photo album editing illustrated in FIG. 12. As illustrated in the drawing, "edited image IDs" are set in a slot 4012 and a slot 4013, and thus, not only images designated by the "automatic layout image IDs" but also, image files having edited image IDs 001 and 003 are drawn. On the other hand, in a slot 4011 and a slot 4014, the "edited image IDs" are not set, and thus, image files designated by automatic layout image IDs 002 and 006 are drawn.

By repeating the process described above, a user can replace image files that are automatically laid out in each page.

Figure 14:
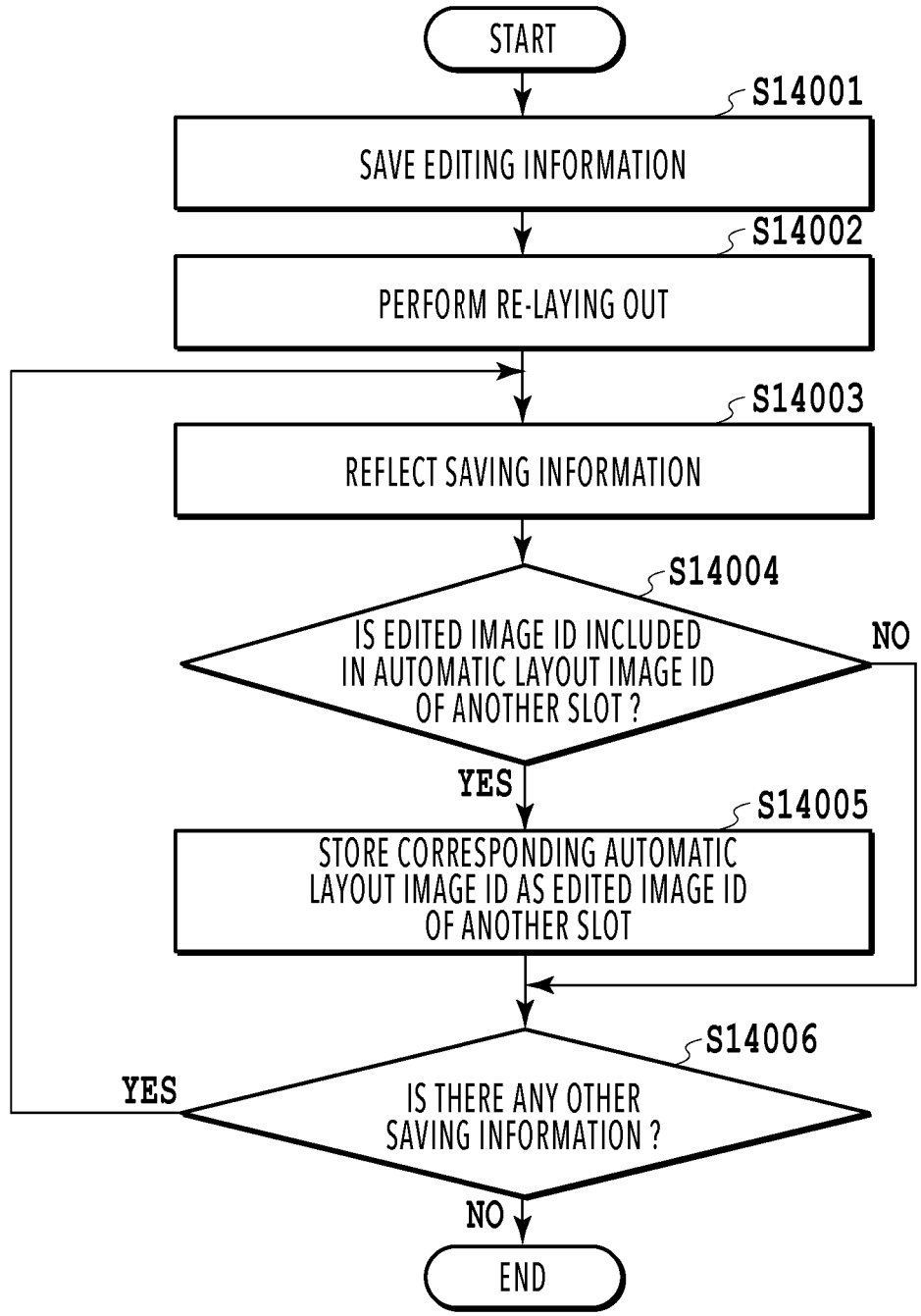
FIG. 14 is a flowchart of a re-laying out process according to Embodiment 1.

FIG. 14 illustrates a flowchart of a re-laying out process according to the present embodiment. Hereafter, after image files are replaced, the process of automatically laying out image files again that is performed by the information processing apparatus 1004 will be described with reference to FIG. 14. The following process is performed by the information processing apparatus 1004 executing the album generating application 2002.

In Step S14001, the information processing apparatus 1004 extracts and saves "automatic layout image IDs" and "edited image IDs" of an editing result from the automatic layout result table after photo album editing illustrated in FIG. 12. In other words, the editing result storing unit 2013 stores a content edited by a user in a storage unit such as the storage device 1008. FIG. 15 illustrates a re-layout saving table used for saving the "automatic layout image IDs" and the "edited image IDs" that have been extracted. Data required to be saved is data for which the "edited image IDs" are designated, and data of a slot 4012 and a slot 4013 is extracted from the automatic layout result table illustrated in FIG. 12. Then, an "automatic layout image ID" that is an image identifier of an image file before editing and an "edited image ID" that is an image identifier of an image file after editing are associated with each other and are stored as a set.

Figure 16:
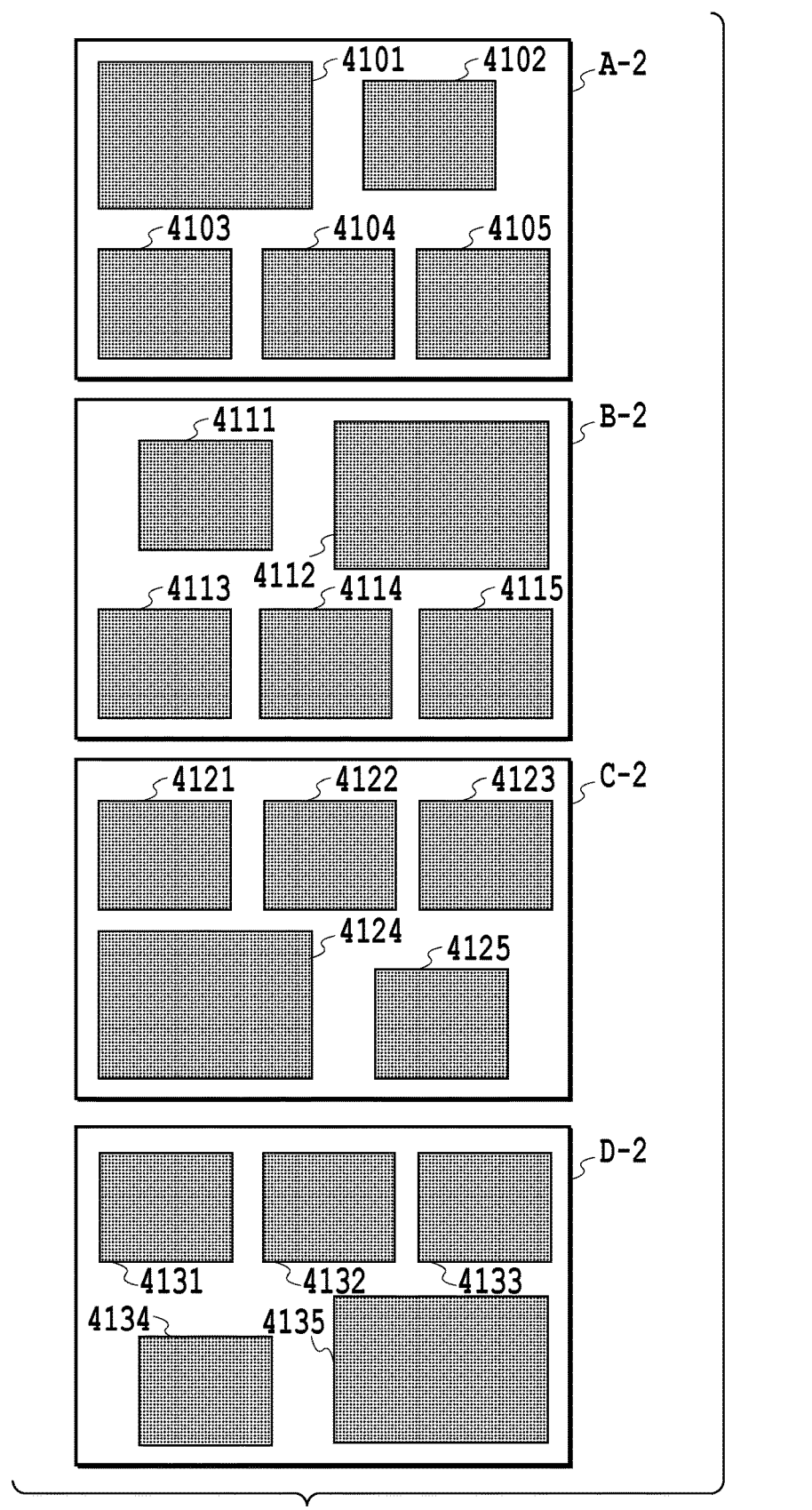
FIG. 16 is a diagram of drawing of template data in a re-laying out process according to Embodiment 1.

In Step S14002, the information processing apparatus 1004 re-lays out one page. In other words, the automatic layout processing unit 2012 functions as a layout unit. Here, templates of different types, templates in which the number of slots is increased or decreased, or the like, are used. The reason for this is that, even when the same template as that in the automatic layout process of Step S3005 illustrated in FIG. 3 is used, there is no change in the layout result. In addition, in a case when the size or the form of the template is changed, a template of the changed size or form is used. For example, in a case when a template of which one page has a rectangular shape is changed into a vertically-long rectangle or a horizontally-long rectangle, a template having the vertically-long rectangle or the horizontally-long rectangle is used. Other than that, by changing the scoring criterion of Step S3003 illustrated in FIG. 3 or by changing the priority levels of the template data illustrated in FIG. 5, a different layout result can be acquired. In the present embodiment, as an example, in each template data as illustrated in FIGS. 16 and 17, templates A-2, B-2, C-2, and D-2 each including five slots are assumed to be used.

Figure 19:
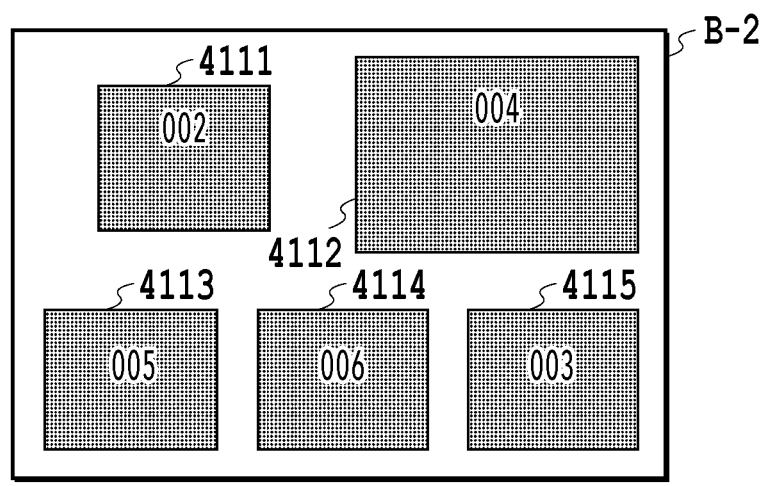
FIG. 19 is a diagram of a drawing of the development process of a re-laying out process according to Embodiment 1.

Since the process of automatically laying out image files in a plurality of templates is the same as that of Step S3005 illustrated in FIG. 3, the description will not be presented, and a re-layout calculation table that is a result of the process is illustrated in FIG. 18. In addition, as a reference for the development process of the re-laying out process, a result of drawing of a template B-2 that is automatically selected on the basis of the re-layout calculation table of FIG. 18 is illustrated in FIG. 19. When the result of drawing illustrated in FIG. 19 and the editing result illustrated in FIG. 12 are compared with each other, it can be known that, as a result of performing the automatic laying-out process again, the editing result according to the user's replacement of image files is discarded. According to the present invention, also, in such a case, the editing result according to the user's replacement of the image files is maintained and can be reflected on a re-layout result.

In Step S14003, the information processing apparatus 1004 reflects the data (in other words, saving information that is the content edited by the user) saved in Step S14001 on a re-layout result according to re-laying out in Step S14002. In other words, the editing result storing unit 2013 functions as an editing result reflecting unit. More specifically, the information processing apparatus 1004 specifies a slot in which an "automatic layout image ID" saved in the re-layout saving table illustrated in FIG. 15 is allocated from the re-layout result acquired in Step S14002. Thereafter, as an "edited image ID" of the specified slot, an "edited image ID" saved in the re-layout saving table illustrated in FIG. 15 is registered. The data of the re-layout saving table illustrated in FIG. 15 is sequentially processed one row each time in the process of Steps S14003 to S14006. Hereafter, this process will be described in detail by referring to the procedure of the re-laying out process and the re-layout result table illustrated in FIGS. 20A to 20D.

FIG. 20A illustrates a re-layout result in Step S14002. FIG. 20B illustrates a state in which an "edited image ID" represented in the first row of the re-layout saving table illustrated in FIG. 15 is reflected on the re-layout result. In the first row of the re-layout saving table illustrated in FIG. 15, the "automatic layout image ID" is "004", and the "edited image ID" is "001". As a result of reflection of this saving data, "001" is stored in the "edited image ID" of a slot 4112 illustrated in FIG. 20B. As illustrated in FIG. 20C, when data represented in the second row of the re-layout saving table illustrated in FIG. 15 is reflected on the re-layout result, "003" is stored in the "edited image ID" of a slot 4113.

In Step S14004, the information processing apparatus 1004 determines whether or not the "edited image ID" stored in Step S14003 is included as an "automatic layout image ID" of any other slot. The "edited image ID" represented in the first row of the re-layout saving table illustrated in FIG. 15 is "001" and is not included in the column of the "automatic layout image ID" illustrated in FIG. 20B. Thus, in the process of the first row of the re-layout saving table illustrated in FIG. 15, the process proceeds to Step S14006.

On the other hand, the "edited image ID" represented in the second row of the re-layout saving table illustrated in FIG. 15 is "003" and is included in the column of the "automatic layout image ID" illustrated in FIG. 20C. Accordingly, in the process of the second row of the re-layout saving table illustrated in FIG. 15, the process proceeds to Step S14005.

In Step S14005, the information processing apparatus 1004 stores the "automatic layout image ID" maintained as a set together with the "edited image ID" stored in Step S14003 in an "edited image ID" of another slot. Here, the another slot is a slot including the "edited image ID" stored in Step S14003 as an "automatic layout image ID".

As illustrated in FIG. 20C, by repeating the process of Step S14003 in the process of the second row of the re-layout saving table illustrated in FIG. 15, "003" is stored in the "edited image ID" of the slot 4113. Then, in Step S14004, it is determined that the image ID 003 is included in the "automatic layout image ID" of a slot 4115. For this reason, in Step S14005, "005" that is the "automatic layout image ID" of the slot 4113 is stored in the "edited image ID" of the slot 4115. FIG. 20D illustrates a re-layout result table after the reflection of the saving information. In this way, it can be prevented that the same image file is duplicately drawn.

In Step S14006, the information processing apparatus 1004 determines whether there is another saving information that has not been processed in the re-layout saving table illustrated in FIG. 15. In a case when there is any other saving information, the process is returned to Step S14003, and the process is repeated. On the other hand, in a case when there is no other saving information, the process ends.

Figure 21:
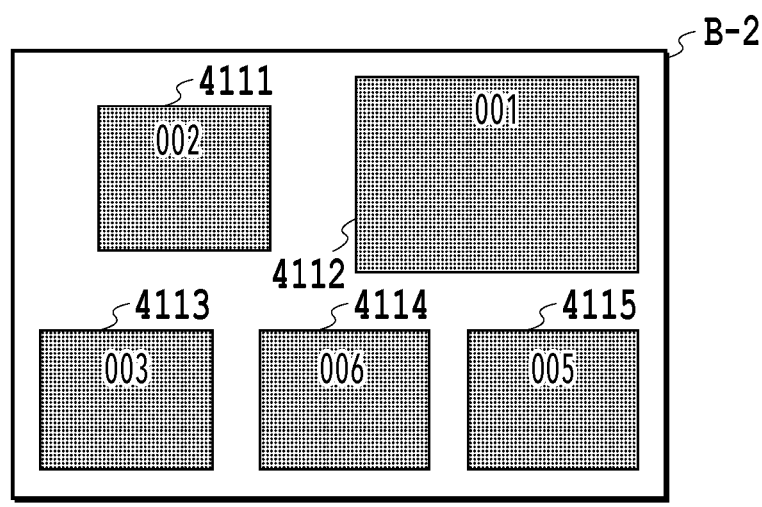
FIG. 21 is a diagram illustrating a re-layout result according to Embodiment 1.

FIG. 21 illustrates a diagram of drawing of a template B-2 based on the re-layout result table illustrated 20D after the end of the re-laying out process. When the diagram of the drawing of the editing result illustrated in FIG. 13 and the diagram of the drawing of the re-layout result illustrated in FIG. 21 are compared with each other, it can be known that the editing result of the user's replacement of the image files is reflected in the slots 4112 and 4113 illustrated in FIG. 21 also after the re-laying out process. In addition, in the slot 4115 illustrated in FIG. 21, further replacement of an image file in consideration of the editing result is performed.

According to the flow process described above, even in a case when a user performs a re-laying out process after editing an image file, a layout result on which the user's editing result is reflected can be acquired.

Embodiment 2

In the re-laying out process according to Embodiment 1, after user's editing information is saved in the re-layout saving table illustrated in FIG. 15, an automatic laying-out process for selecting an optimal one template from among a plurality of templates is performed again. On the other hand, in a re-laying out process according to the present embodiment, an automatic laying-out process is performed after a user individually designates templates after change. In other words, the automatic laying-out process is performed on the basis of templates that are explicitly designated by a user. More specifically, in the re-laying out process according to the present embodiment, template conversion tables before and after change are generated by determining a slot corresponding to each template in advance, and image files are laid out. By performing as such, a re-layout result on which a user's editing result (in other words, a content edited by the user) is reflected can be acquired.

The automatic laying-out process of the first time and a user's editing operation are the same as those according to Embodiment 1, and thus, the description thereof will not be presented.

Figure 22:
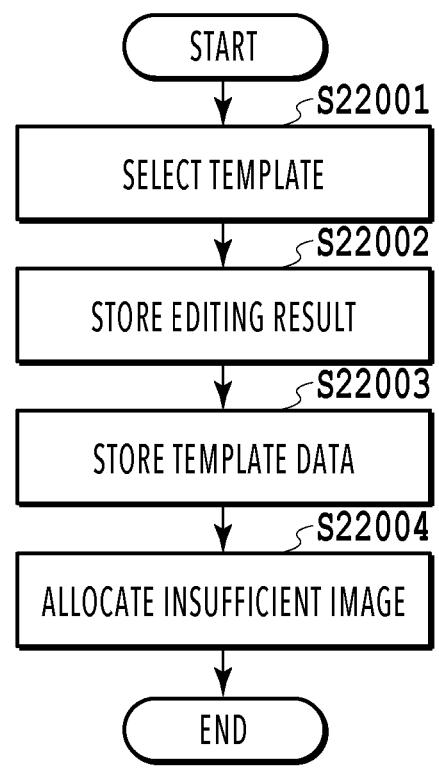
FIG. 22 is a flowchart of a re-laying out process according to Embodiment 2.

FIG. 22 illustrates a flowchart of the re-laying out process according to Embodiment 2. Hereafter, the process of automatically laying out of a page layout after a user's editing operation by using a different template will be described with reference to FIG. 22. The following process is performed by the information processing apparatus 1004 executing the album generating application 2002. A user operation is performed on a user interface provided by the album generating application 2002.

FIG. 23 illustrates a template data table according to Embodiment 2 and illustrates template data of a template B-1 before a change and a template B-2 after a change. The template data tables illustrated in FIG. 23 are different from the template data tables illustrated in FIGS. 5 and 17 in that a "corresponding ID" is included for each slot. In the "corresponding ID", an identifier used for associating slots of mutually-different templates is stored in advance, and a common identifier is stored in a corresponding slot. In other words, at least a part of slots of mutually-different templates are stored in association with each other.

FIGS. 24A to 24C illustrate the procedure and a conversion table in the re-laying out process according to Embodiment 2.

First, in Step S22001 illustrated in FIG. 22, a user selects a template (a template after change). Here, it is assumed that the template B-2 illustrated in FIGS. 16 and 17 is selected for a template B-1 for which an editing operation is performed.

In Step S22002, the information processing apparatus 1004, as illustrated in FIG. 24A, stores a state before re-layout, that is, a user's editing result in the conversion table. The conversion table functions as a storage unit of an editing result. More specifically, "slot ID (slot identifier)" of the automatic layout result table after editing illustrated in FIG. 12 is stored as "slot ID before change" of the conversion table. In addition, "automatic layout image ID" or "edited image ID" of the automatic layout result table after editing illustrated in FIG. 12 is stored as "image ID" of the conversion table. In other words, in FIG. 24A, "001" and "003" that are "edited image IDs" of the automatic layout result table after editing illustrated in FIG. 12 are stored in "image IDs" of the edited slots 4012 and 4013. In addition, in FIG. 24A, "002" and "006" that are "automatic layout image IDs" of the automatic layout result table after editing illustrated in FIG. 12 are respectively stored in "image IDs" of slots 4011 and 4014 that have not been edited.

In Step S22003, the information processing apparatus 1004, as illustrated in FIG. 24B, stores template data of the template after a change selected in Step S22001 in the conversion table. In other words, the information processing apparatus 1004 acquires "slot ID" of the template B-2 after a change from the template data table illustrated in FIG. 17, and stores the acquired slot IDs in the "slot ID after change" of the conversion table. At this time, a correspondence relation between slots before and after a change is in accordance with the "corresponding ID" of the template data table illustrated FIG. 23. The first row of the conversion table is the slot 4011, and, by referring to the template B-1 illustrated in FIG. 23, the "corresponding ID" of the slot 4011 is "1". Next, by referring to the template B-2 illustrated in FIG. 23, a slot of which the "corresponding ID" is "1" is a slot 4111. Accordingly, since the slot 4111 has a common identifier, the slot 4111 is stored in the "slot ID after change" of the first row of the conversion table. Similarly, in the "slot IDs after change" of a slot 4012, a slot 4013, and a slot 4014 of the conversion table, corresponding slot IDs of the template B-2 are respectively stored. Finally, a slot ID 4115 that is not referred to in the template B-2 illustrated in FIG. 23 is stored in the last row of the conversion table. In this way, as illustrated in FIG. 24B, the template data of the template after change selected in Step S22001 is stored in the conversion table.

In Step S22004, while the "slot IDs after change" are stored in the conversion table, the information processing apparatus 1004 allocates and stores an "image ID" in a row in which the "image ID" is not stored. In other words, the information processing apparatus 1004 allocates insufficient images for the template after a change. More specifically, new image files that have not been used are set in order of highest to lowest analysis score from the image data table illustrated in FIG. 6. Here, as illustrated in FIG. 24B, since image IDs that are used are "001", "002", "003", and "006", the image IDs of new image files that have not been used are three image IDs of "004", "005", and "007". Among the three image files, since an image ID of an image file having a highest analysis score is "004", this image ID 004 is stored as an image ID corresponding to the slot ID 4115 after a change illustrated in FIG. 24B. FIG. 24C illustrates a conversion table as a result of storage of all the data.

Figure 25:
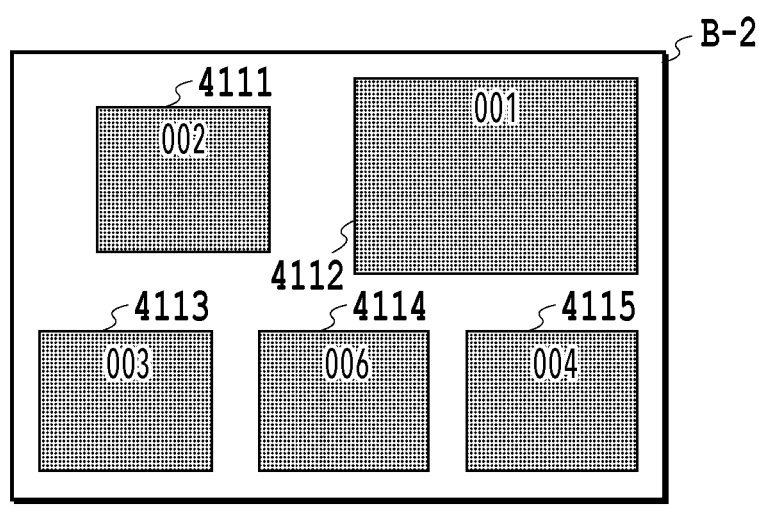
FIG. 25 is a diagram of drawing of a re-layout result according to Embodiment 2.

FIG. 25 illustrates a diagram of drawing of the template B-2 based on the conversion table illustrated in FIG. 24C. When the diagram of the drawing of the user's editing result illustrated in FIG. 13 is compared with the diagram of the drawing illustrated in FIG. 25, it can be known that the editing result of user's replacement of image files is reflected on slots 4112 and 4113 illustrated in FIG. 25. The reason for this is that slots are associated with each other between the templates before and after a change. In addition, in a slot 4115 in which image data is not allocated in the template after a change, image data 004 having a highest score among image data that has not been used is laid out. In this way, the editing result storing unit 2013 functions as a reflection unit for reflecting an editing result on the re-layout result. In other words, in the present embodiment, by generating a conversion table for templates before and after a change, the editing result can be reflected on the re-layout result.

According to the process of the flow described above, even when a user performs a re-laying out process after editing image files, a layout result on which the user's editing result is reflected can be acquired.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the present invention, even in a case when a user performs a laying-out process again after editing, such as replacement of an image arranged in a template, the user's editing result can be reflected on the re-layout result.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
at least one processor causing the information processing apparatus to act as:
(a) an analyzing unit configured to analyze information of a score and information of a capture data and time for each of a plurality of image data;
(b) a laying-out unit configured to perform a laying-out processing in which image data is arranged in a template using the information of the score and the information of the capture date and time;
(c) an image replacement unit configured to replace first image data that is arranged in a first slot of the template with second image data based on a user instruction; and
(d) a storage control unit configured to store information regarding the image replacement,
wherein, in a case when the first image data is rearranged in the first slot by performing the laying-out processing using the information of the score and information of the capture data and time after the first image data is replaced with the second image data, the first image data is replaced with the second image data based on the stored information regarding the image replacement.

2. The information processing apparatus according to claim 1, wherein, in the case when the laying-out unit performs the laying-out processing after the image replacement of the first image data with the second image data, the laying-out unit performs the laying-out processing by using a different template from the template used in the lay-out processing before the image replacement.

3. The information processing apparatus according to claim 1, wherein the information regarding the image replacement indicates that an image identifier of the first image data and an image identifier of the second image data are associated with each other.

4. The information processing apparatus according to claim 3, wherein a slot of the template used for the re-laying out is specified by using the image identifier of the first image data and the image identifier of the second image data that is allocated for the specified slot.

5. The information processing apparatus according to claim 4, wherein, in a case when the image identifier allocated for the specified slot is already allocated for another slot of the template used for the re-laying out, an image identifier allocated for the specified slot is allocated for the other slot.

6. An information processing method, the method comprising the steps of:
analyzing information of a score and information of a capture data and time for each of a plurality of image data;
performing a laying-out processing in which image data is arranged in a template using the information of the score and the information of the capture date and time;
replacing first image data that is arranged in a first slot of the template with second image data based on a user instruction; and
storing information regarding the image replacement,
wherein, in a case when the first image data is rearranged in the first slot by performing the laying-out processing using the information of the score and information of the capture data and time after the first image data is replaced with the second image data, the first image data is replaced with the second image data based on the stored information regarding the image replacement.

7. The information processing method according to claim 6, wherein, in the case when the laying-out unit performs the laying-out processing after the image replacement of the first image data with the second image data, the laying-out unit performs the laying-out processing by using a different template from the template used in the lay-out processing before the image replacement.

8. The information processing method according to claim 6, wherein the information regarding the image replacement indicates that an image identifier of the first image data and an image identifier of the second image data are associated with each other.

9. The information processing method according to claim 8, wherein a slot of the template used for the re-laying out is specified by using the image identifier of the first image data and the image identifier of the second image data that is allocated for the specified slot.

10. The information processing method according to claim 9, wherein, in a case when the image identifier allocated for the specified slot is already allocated for another slot of the template used for the re-laying out, an image identifier allocated for the specified slot is allocated for the other slot.

* * * * *